June 5, 1951 C. T. HATCH 2,555,692
LINKED ROD CONVEYER
Filed April 20, 1948

INVENTOR.
Charles T. Hatch
BY
Attorney.

Patented June 5, 1951

2,555,692

UNITED STATES PATENT OFFICE 2,555,692

LINKED ROD CONVEYER

Charles T. Hatch, Albion, Mich., assignor to Union Steel Products Company, Albion, Mich.

Application April 20, 1948, Serial No. 22,149

4 Claims. (Cl. 198—195)

This invention relates to improvements in linked rod conveyors.

The main objects of this invention are:

First, to provide a linked rod type of conveyor which is more durable than linked rod type of conveyors now in common use.

Second, to provide a linked rod type of conveyor having the advantages noted which may be economically produced with relatively slight addition in the amount of stock and work required as compared to presently used conveyors of the linked rod type.

Further objects, and objects relating to details and economies of the invention will definitely appear from the description to follow. The invention is pointed out in the claims.

A preferred embodiment of the invention is clearly illustrated in the accompanying drawing, in which.

Figure 1:
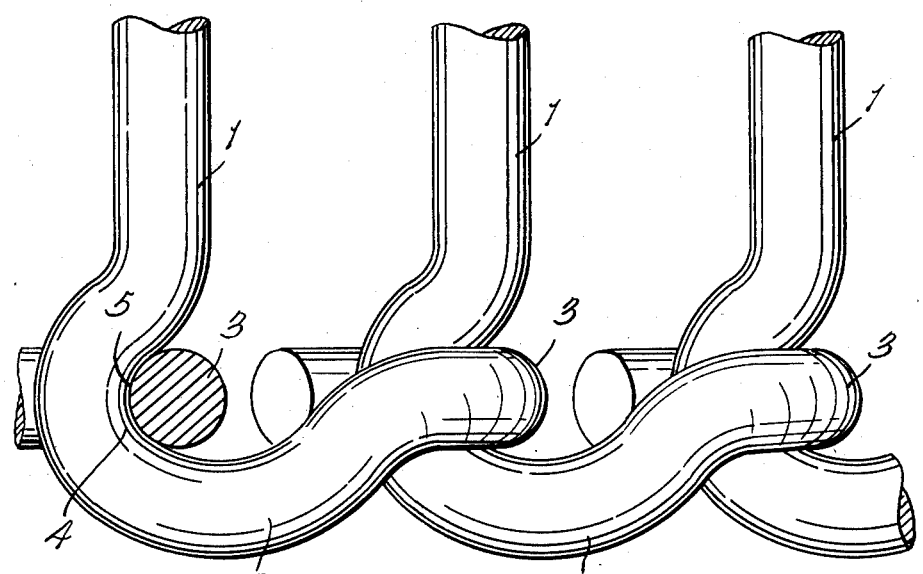
Fig. 1 is an enlarged fragmentary plan view of a conveyor embodying the features of my invention, one of the link arm eyes being shown in section.
Figure 2:
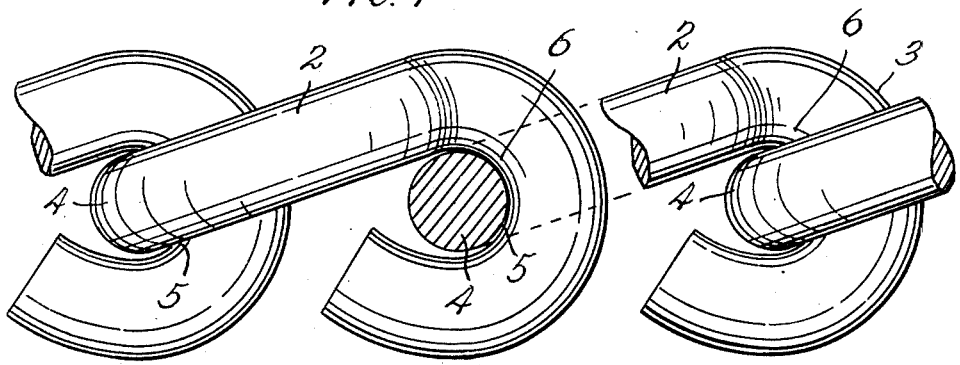
Fig. 2 is a fragmentary end elevational view of the structure shown in Fig. 1 with parts of one of the link arms broken away and the bearing offset of the rod shown in section.
Figure 3:
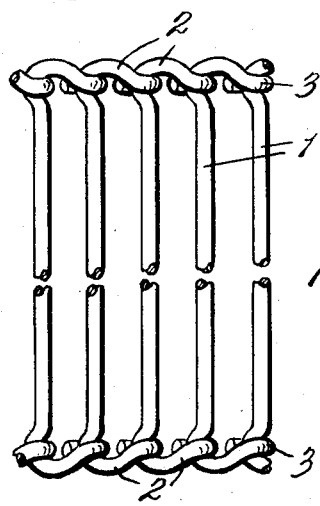
Fig. 3 is a fragmentary plan view of the conveyor of my invention illustrating both edges thereof.

The applicant is aware that linked type conveyors comprising cross rods having link arms at their ends engaging an adjacent rod are widely used and applicant is familiar with the manufacture and use of such conveyors. These conveyors, however, are of relatively short life and particularly during the initial use thereof subject to very rapid wear. This necessitates frequent takeups during the early use of such conveyors and objectionably frequent replacements due to wear. The applicant's invention, as stated, very materially prolongs the life of the conveyor.

The embodiment of my invention illustrated in the accompanying drawing comprises a plurality of cross rods or members 1 formed of rod stock of curved section and having integral link arms 2 at their ends terminating in eyes 3 embracing an adjacent rod, the rods being thus connected in succession one with another. The arms 2 are preferably outwardly curved and eyes 3 inwardly offset. The rods have curved offsets 4 which merge into the arms or into which the arms merge providing curved bearings 5 of substantial arc. The curvature of these bearings corresponds to the cross sectional curvature of the eyes so that there is a bearing engagement between the eyes and the bearing surfaces of the offsets through a substantial arc, this in the embodiment illustrated being of the order of 120°.

The eyes 3 are inwardly offset so that they are aligned with the offsets of the rods. The eyes are curved to provide bearing surfaces 6 of substantial arc, that is, the eyes embrace the offsets providing surfaces of substantial arc in the embodiment illustrated approximating about 180°. This greatly increases the bearing surface area between the rod members and the eyes of their link arms thereby greatly minimizing wear as compared to the structure now in wide use with which the applicant is familiar in which the eyes embrace a straight portion of the rod and have, in effect, point or at best line contact until substantial wear has resulted providing somewhat flattened bearing surfaces.

The conveyors of my invention can be very economically produced and are durable and lateral shifting movement of the rod members relative to each other is minimized.

I have illustrated and described my invention as embodied in a conveyor designed for use in bakeries, factories, warehouses and the like. It is believed that this disclosure will enable those skilled in the art to embody or adapt my invention as may be desired.

Having thus described my invention, what I claim as new and desire to secure by Letters Patent is:

1. A conveyor of the class described comprising, a plurality of cross rods of curved cross section having laterally disposed outwardly curved link arms at their ends terminating in eyes embracing an adjacent rod, the rods having integral curved offsets at their ends disposed in the plane of their arms, the eyes being inwardly offset relative to the arms and disposed in alignment with the offsets, the curvature of the inner sides of the offsets corresponding to the cross sectional curvature of the rods providing bearing engagement of the eyes with the offsets throughout a substantial arc, the inner curvature of the eyes being in embracing bearing engagement with the offsets throughout a substantial arc thereof.

2. A conveyor of the class described comprising, a plurality of cross rods of curved cross section having laterally disposed link arms at their ends terminating in eyes embracing an adjacent rod, the rods having integral curved offsets at their ends, the eyes being disposed in alignment with the offsets, the curvature of the inner sides of the offsets corresponding to the cross sectional curvature of the rods providing bearing engagement of the eyes with the offsets throughout a substantial arc, the eyes being in embracing bearing engagement with the offsets throughout a substantial arc thereof.

3. A conveyor of the class described comprising, a plurality of cross rods having laterally disposed link arms at their ends, the rods having curved offsets at their ends disposed in the plane of the arms and into which the arms merge providing curved bearing surfaces of substantial arc, the arms having eyes engaging said curved bearing surfaces of an adjacent rod and providing bearing surfaces of substantial arc coacting with the bearing surfaces of the offsets, said rod being of curved cross section at its point of engagement with said eyes, the curvature of said bearing surfaces of the offsets corresponding approximately to the cross sectional curvature of the rods.

4. A conveyor of the class described comprising, a plurality of cross rods of curved cross section having laterally disposed link arms at their ends, the shanks of said arms and the ends of the rods being conformed to provide inwardly curved bearing surfaces of substantial arc corresponding to the cross sectional curvature of the rods, the arms terminating in eyes embracing said bearings and having inner bearing surfaces of substantial arc conformed to the said bearings of the rods whereby a relatively large bearing area is provided between the coacting bearing parts.

CHARLES T. HATCH.

REFERENCES CITED

The following references are of record in the file of this patent:

UNITED STATES PATENTS

| Number | Name | Date |
| --- | --- | --- |
| 1,676,481 | Crummey | July 10, 1928 |
| 2,112,911 | Johnson | Apr. 5, 1938 |
| 2,149,776 | Knoerzer | Mar. 7, 1939 |
| 2,210,462 | Noffsinger | Aug. 6, 1940 |
| 2,244,827 | Crawford | June 10, 1941 |